UNITED STATES PATENT OFFICE.

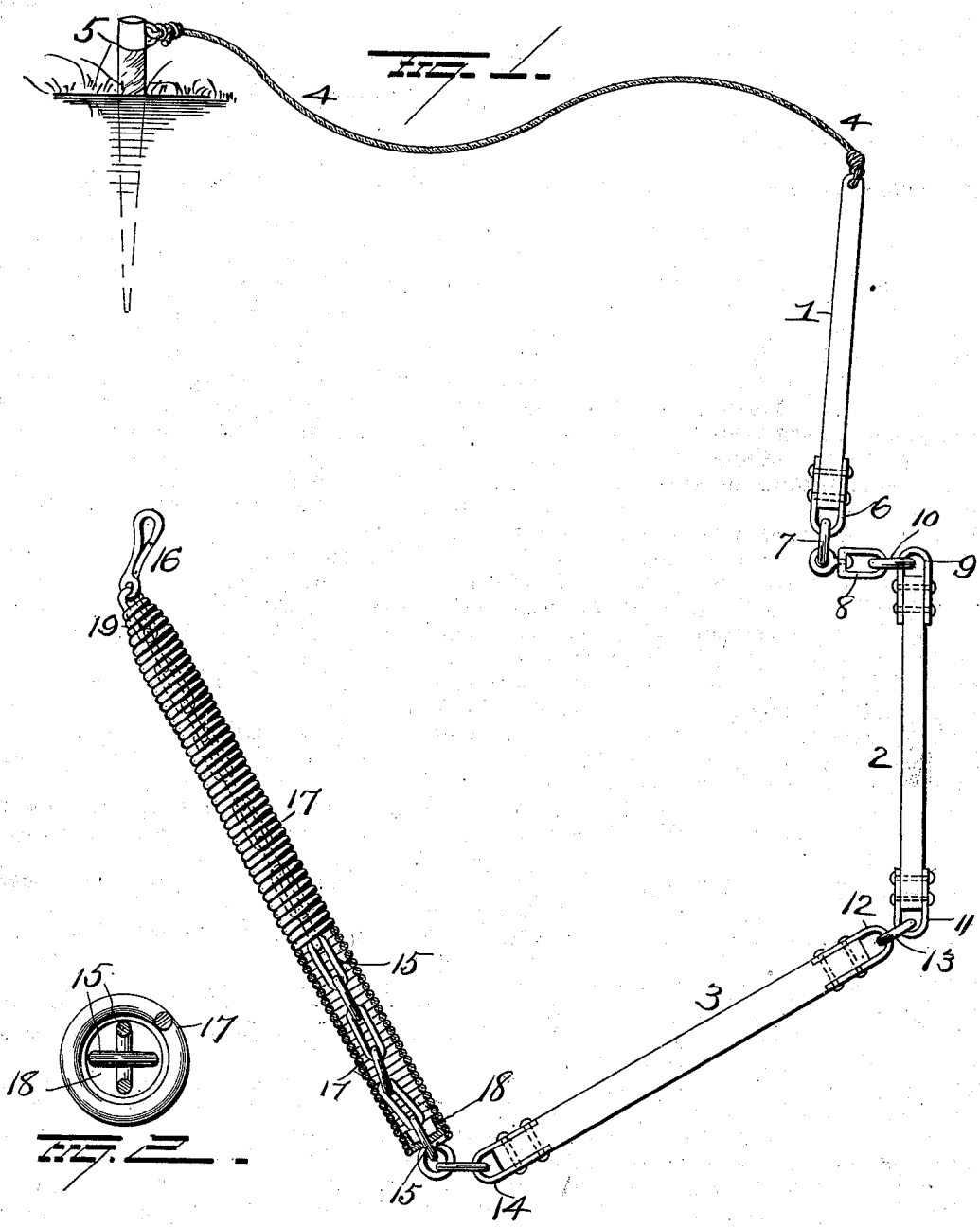

HENRY JEFFERSON DAVIS, OF WAYNESBORO, GEORGIA, ASSIGNOR OF ONE-HALF TO WILLIAM HUDSON DAVIS, OF WAYNESBORO, GEORGIA.

TETHER.

SPECIFICATION forming part of Letters Patent No. 695,427, dated March 11, 1902.

Application filed July 26, 1901. Serial No. 69,837. (No model.)

*To all whom it may concern:*

Be it known that I, HENRY JEFFERSON DAVIS, of Waynesboro, in the county of Burke and State of Georgia, have invented certain new and useful Improvements in Tethers; and I do hereby declare the following to be a full, clear, and exact description of the invention, such as will enable others skilled in the art to which it appertains to make and use the same.

My invention relates to an improvement in tethers, the object of the invention being to produce an animal-tether which shall be light and inexpensive in construction, which shall not be liable to become entangled with the animal's legs or to be wound around the post or stake, which will not injure the animal, and which shall be effectual in all respects in the performance of its functions.

With these objects in view the invention consists in certain novel features of construction and combinations and arrangements of parts, as hereinafter set forth, and pointed out in the claims.

In the accompanying drawings, Figure 1 is a view of a tether embodying my invention. Fig. 2 is an enlarged detail view of a portion of the device.

1 2 3 represent a series of wooden bars, one of which (the bar 1) is connected, by means of a rope 4, with a suitable post or stake 5. The bar 1 is provided at its opposite end with a metal clip 6, the loop portion of which projects beyond the end of the bar for the reception of a link 7. The link 7 serves to loosely attach to the clip one member of a turnbuckle 8, the other member of said turnbuckle being connected with a clip 9, secured to one end of the bar 2 by means of a link 10. The other end of the bar 2 is provided with a clip 11, which is loosely connected with a clip 12 at one end of the bar 3 by means of a link 13. The other end of the bar 3 is provided with a clip 14, to which one end of a chain 15 is attached, and the other end of the chain may be provided with a snap-hook 16 to permit the tether to be readily attached to the animal. In order to prevent the chain from injuring the animal or becoming wrapped about his legs, said chain is inclosed by a coiled spring 17. The coil 17 is preferably made about ten feet long, and the chain 15 will be made somewhat longer. For this reason a block 18, of wood, iron, or tin, is inserted into one end of the spring to prevent the chain from being pulled through the end thereof, and the other end of the coil is made conical, as at 19, to properly retain the chain in place, as well as to prevent the coil from catching on snags or injuring the animal, and through this conical end of the spring the chain is freely movable.

If the animal is gentle, the wooden sections may be omitted. With a less gentle animal one wooden bar eight or ten feet long may be employed, and with a restless horse several bars may be employed.

Instead of the chain, rope may be used, and instead of rope for attachment to the stake a chain may be employed. Rubber hose may be used instead of the coil and the chain omitted.

My improvements are simple in construction and are capable of being made light, strong, cheap, and effective.

Slight changes might be made in the details of construction of my invention without departing from the spirit thereof or limiting its scope, and hence I do not wish to limit myself to the details herein set forth.

Having fully described my invention, what I claim as new, and desire to secure by Letters Patent, is—

1. A tether comprising a series of wooden bars, clips secured to and projecting beyond said bars, loose connections between said clips, a flexible device for connecting the bars to a stake, a chain attached to one end of one of said bars, and a spring inclosing said chain.

2. A tether comprising a series of wooden bars connected loosely together, a chain attached to one end bar, a rope attached to the other end bar, and a coiled spring inclosing said chain.

3. A tether comprising a series of bars loosely connected together, a flexible device secured to one end bar, a chain attached to the other end bar and a spring through which said chain passes, and from both ends of which it protrudes.

4. In a tether, the combination with a coil, of a flexible device longer than said coil disposed within the latter and extending freely through one end thereof and means for closing the ends of the coil around the flexible device.

5. In a tether, the combination with a coil having a conical end, of a flexible device longer than the coil and disposed within the same and projecting freely through said conical end, means for attaching the flexible device to an animal and means for connecting it with a stake.

6. In a tether, the combination of a coil, a flexible device longer than the coil disposed within the same, and projecting beyond both of its ends and freely movable through one end, a block in the other end of the coil surrounding the flexible device, means for connecting one end of the flexible device with a stake and means for attaching the other end of the flexible device to an animal.

In testimony whereof I have signed this specification in the presence of two subscribing witnesses.

HENRY JEFFERSON DAVIS.

Witnesses:
E. S. GARLICK,
C. B. GARLICK.